United States Patent [19]

Coggin

[11] 4,167,403
[45] Sep. 11, 1979

[54] APPARATUS AND METHOD FOR MAINTAINING CALIBRATION OF A THERMOCOUPLE USED IN A BUSHING FOR THE DRAWING OF GLASS FIBER

[75] Inventor: Charles H. Coggin, Upland, Calif.

[73] Assignee: Nitto Boseki Co., Ltd., Tokyo, Japan

[21] Appl. No.: 915,280

[22] Filed: Jun. 13, 1978

Related U.S. Application Data

[63] Continuation-in-part of Ser. No. 848,890, Nov. 7, 1977, abandoned.

[51] Int. Cl.$^2$ .............................................. C03B 37/02
[52] U.S. Cl. ............................................... 65/1; 65/2;
65/11 W; 65/29; 65/162; 65/374 M; 73/359 R
[58] Field of Search .................... 65/1, 2, 11 R, 11 W,
65/29, 162, 374 M; 73/359 R

[56] References Cited

U.S. PATENT DOCUMENTS

| 3,162,038 | 12/1964 | Roberson et al. | 65/162 X |
| 3,246,124 | 4/1966 | Trethewey | 65/162 X |
| 3,269,816 | 8/1966 | Helbing | 65/2 |
| 3,737,982 | 6/1973 | Calhoun et al. | 73/359 R |
| 3,905,790 | 9/1975 | Strickland | 65/2 |

Primary Examiner—Robert L. Lindsay, Jr.
Attorney, Agent, or Firm—Naylor, Neal & Uilkema

[57] ABSTRACT

A thermocouple connection for a platinum/rhodium glass fiber drawing bushing wherein the dissimilar leads of the thermocouple are extended directly from the bushing and over a length so closely adjacent the bushing that the temperature of the leads over said length is substantially equal to the temperature of the bushing. As a result of thus positioning the leads, migration of the interface between the dissimilar material of the leads does not materially affect the calibration of the thermocouple.

10 Claims, 5 Drawing Figures

APPARATUS AND METHOD FOR MAINTAINING CALIBRATION OF A THERMOCOUPLE USED IN A BUSHING FOR THE DRAWING OF GLASS FIBER

RELATED APPLICATION

This application is a continuation-in-part of my co-pending application Ser. No. 848,890, filed Nov. 7, 1977 now abandoned.

BACKGROUND OF THE INVENTION

The present invention relates to an improved thermocouple connection for use with a platinum/rhodium bushing of the type used for the drawing of glass fibers and, more particularly, is directed to such a connection which maintains its calibration throughout the useful life of the bushing.

In the prior art, thermocouples are commonly used to monitor the temperature of bushings used for the drawing of glass fiber. These bushings are coupled to controllers which, in turn, are coupled to power transformers for supplying current to resistance heat the bushings. Ideally, the thermocouple output is used by the controller to maintain constant the temperature of the bushing.

In practice, it has been found that prior art thermocouple control circuits do not, in fact, maintain bushing temperature constant. Rather, as the bushing ages, the circuits gradually increase bushing temperature. This, in turn, has the undesirable effect of changing the physical character (e.g. fiber thickness) of the glass fiber being drawn. It also effects bushing through-put.

Although it is possible to recalibrate the thermocouples of the prior art to correct the above-mentioned problem, this proves very difficult as a practical matter because of the gradual and continuous nature of the change of thermocouple output.

SUMMARY OF THE INVENTION

The present invention is premised on the discovery that the calibration problem present in the prior art results because of migration of the interface between the dissimilar metals of the thermocouple. Migration is explained by the fact that one lead of the thermocouple is pure platinum or a high platinum alloy, the other lead of the thermocouple is a platinum/rhodium alloy (e.g., 87% platinum and 13% rhodium) and the bushing is a relatively large sink platinum/rhodium alloy (e.g., 80% platinum and 20% rhodium). In use, rhodium migrates from the bushing into the platinum lead of the thermocouple, thus moving the thermocouple junction away from the bushing to a lower temperature area. Movement of the junction to a lower temperature area lowers the output of the thermocouple and, thus, results in an out-of-calibration reading of the bushing temperature.

The reason that migration of the thermocouple junction functions to move the junction to a lower temperature area is that conventional thermocouple connections run the thermocouple leads generally normal to the bushing. Thus, movement of the junction is, necessarily, away from the bushing to a lower temperature area.

The thermocouple connection of the present invention avoids the calibration problem of the prior art by extending the thermocouple leads directly from the bushing and over a length so closely adjacent the bushing that the temperature of the leads over said length is substantially equal to the temperature of the bushing. As a result, even though migration occurs, the junction remains in an area wherein it detects true bushing temperature.

The principal object of the present invention is to provide a thermocouple connection for alloy bushings used for the drawing of glass fiber and the like wherein the calibration of the thermocouple remains substantially constant over the useful life of the bushing.

Another and more general object of the invention is to provide a thermocouple connection for use in a temperature control circuit for an alloy bushing wherein the circuit maintains constant bushing temperature over the life of the bushing.

Still another object of the invention is to provide a thermocouple connection which is joined directly to an alloy member to be monitored and which does not require recalibration with aging.

Another object of the invention is to provide a thermocouple control which reduces the required frequency of quality control checks in glass fiber manufacturing operations.

These and other objects will become more apparent when viewed in light of the accompanying drawings and following detailed description.

DESCRIPTION OF THE PREFERRED EMBODIMENT

Figure 1:
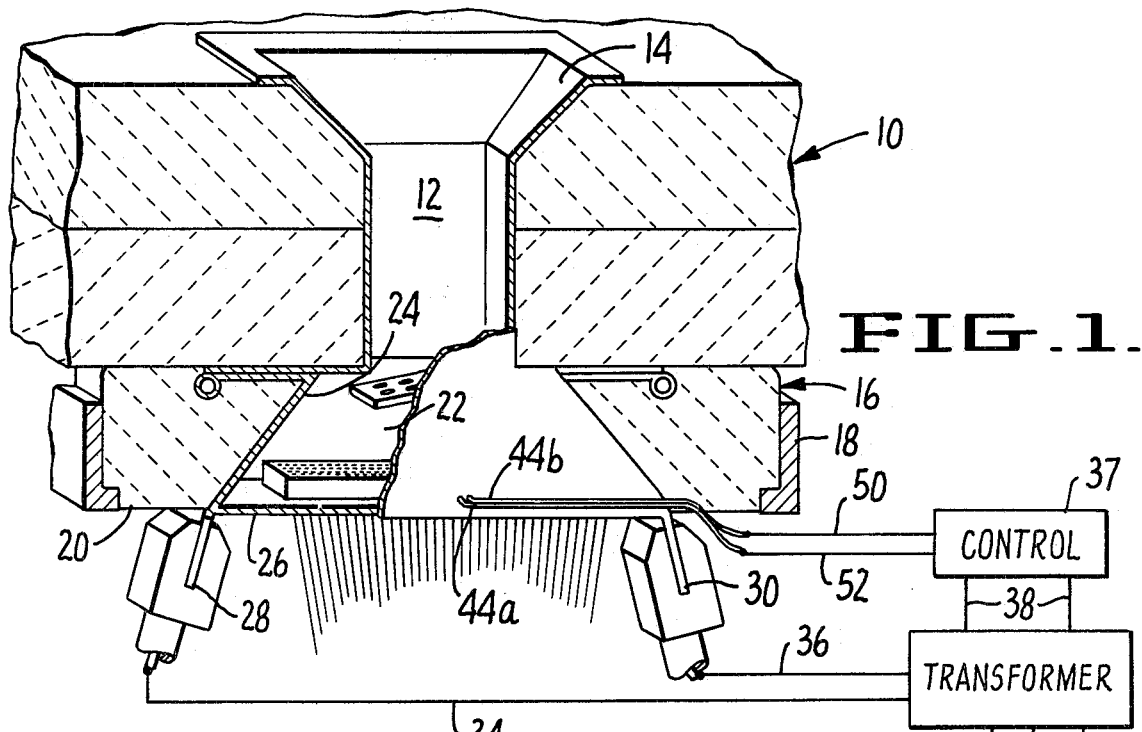
FIG. 1 is a perspective view of a bushing employing the thermocouple connection of the present invention, with parts of the bushing shown in section, and a diagrammatic representation of the resistance heating control circuit for the bushing.

FIG. 1 shows the improved thermocouple connection of the present invention incorporated into a bushing disposed beneath a direct melt forehearth. The illustrated forehearth and bushing are of the type disclosed in my U.S. Pat. No. 3,988,135, granted Oct. 26, 1976. The under side of the illustrated forehearth comprises a flow block 10 constructed of superimposed layers of refractory material having a flow passage 12 extending therethrough and lined with a platinum foil lining 14. The bushing assembly, designated 16, is removably supported beneath the flow block 10 in juxtaposition to the under side of the block. Support of the assembly is effected by a framework comprised of angle members 18 which engage the lateral edges of the under surface of the assembly to maintain the assembly in aligned position with respect to the flow passage 12.

In the illustrated example, the bushing assembly 16 comprises a block 20 having a chamber 22 formed therein and opening through the upper and lower surfaces of the block. The chamber 22 is aligned with the flow passage 12 when the bushing assembly is in place.

The block 20 is fabricated out of a refractory material and the interior of the passage 22 is lined with an alloy lining 24 comprised of 80% platinum and 20% rhodium. An orifice plate 26 extends over the bottom of the flow passage 22 and is integrally joined to the lining 24. The plate 26, like the lining 24, is fabricated of an alloy comprised of 80% platinum and 20% rhodium. The detailed construction and mode of operation of the bushing assembly 16 may be seen from my aforementioned U.S. Pat. No. 3,988,135.

Electrode terminals 28 and 30 are joined to opposite sides of the orifice plate 26 to provide for the resistance heating of the plate. These terminals are connected to a power transformer 32 by leads 34 and 36, respectively. Power is supplied to the transformer 32 by a power source 33. The transformer 32 is controlled by a controller 37. The controller, transformer and electrode circuit are conventional and provided to resistance heat the orifice plate 26 and maintain its temperature substantially constant. Leads 38 couple the controller to the transformer.

The thermocouple connection to which the present invention is directed is connected to the bushing (i.e., the platinum/rhodium elements of the assembly 16) to sense the temperature of the bushing adjacent the orifice plate and provide a control signal to the controller 36. In the illustrated example, the connection comprises: closely spaced orifices 40 and 42 formed through the lining 24 closely adjacent the orifice plate 26 at a location disposed generally centrally of the length of the plate; a platinum/rhodium alloy lead 44 of 87% platinum and 13% rhodium extending through the orifice 40; a pure platinum lead 46 extending through the orifice 42; a weld junction 48 between the leads 44 and 46; welds $44_a$ and $46_a$ joining the respective leads 44 and 46 to the lining 24; and, extended portions $44_b$ and $46_b$ extending directly from the leads 44 and 46 over a length so closely adjacent the orifice plate 26 and the exterior surface of the lining 24 that the temperature of said portions is substantially equal to that of the junction 48.

Figure 3A:
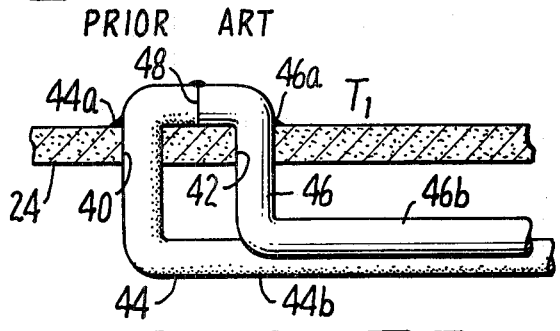
FIG. 3A is a cross sectional view of the thermocouple connection of the present invention, as it would appear when new.
Figure 3B:
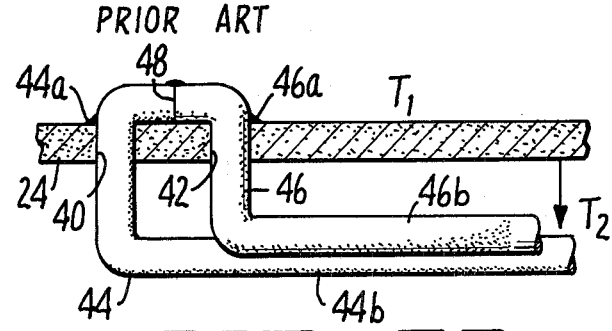
FIG. 3B is a cross sectional view of the thermocouple connection of the present invention, as it would appear after it had aged.

The inventive connection is shown in detail in FIGS. 3A and 3B. In these figures, the internal bushing temperature at the junction 48 is designated $T_1$ and the temperature of the extended portions $44_b$ and $46_b$ is designated $T_2$. FIG. 3A depicts the connection when new in a condition wherein the interface between the dissimilar metals of the thermocouple is at the junction 48. FIG. 3B depicts the connection in aged condition wherein the interface between the dissimilar metals of the thermocouple has migrated into the portion $46_b$ so as to be disposed at temperature $T_2$.

The migration depicted in FIG. 3B is the result of rhodium migrating into the platinum lead 46 from the sink of platinum/rhodium alloy provided by the bushing. As a result of the migration, the point at which temperature is sensed by the thermocouple moves along the lead 46. This results because temperature is sensed at the interface of the dissimilar metals of the thermocouple. Since temperatures $T_1$ and $T_2$ are substantially equal with the present invention, however, this change of location does not result in a misreading.

In one example of the invention, the orifice plate is approximately 10 inches long and the lead portions $44_b$ and $46_b$ extend over approximately half of this length (i.e., about 5 inches). The space between the portions $44_b$ and $46_b$ and the exterior of the lining 24 is approximately one-eight inch. In assembly of the bushing, this space may be maintained by providing glass bead spacers on the lead portions. The lead portions are cast within the refactory material on the block 20 and disposed about one-fourth of an inch above the orifice plate 26. The lead portions $44_b$ and $46_b$ are connected to the controller 36 by connecting leads 50 and 52, respectively.

Figure 2A:
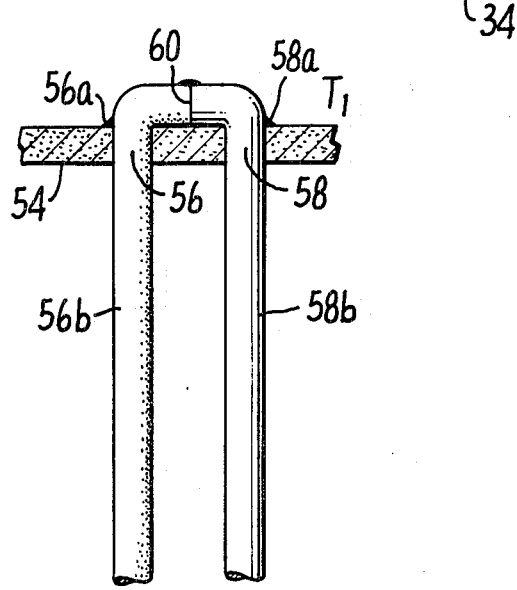
FIG. 2A is a cross sectional view of a typical prior art thermocouple connection, as it would appear when new.
Figure 2B:
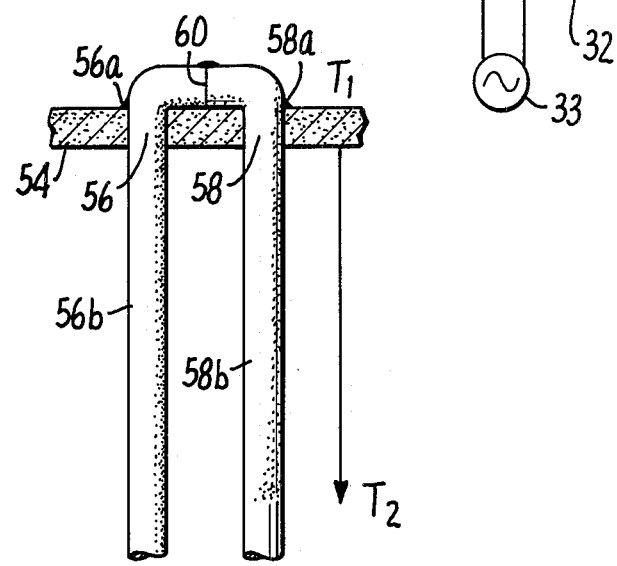
FIG. 2B is a cross sectional view of a prior art connection similar to that of FIG. 2A, as it would appear after the connection had aged.

FIGS. 2A and 2B illustrate a conventional prior art thermocouple connection. Although not illustrated, it should be understood that this connection would be coupled to a control and transformer circuit similar to that of FIG. 1 for the purpose of controlling the temperature of a bushing. The bushing lining wall in these figures is designated by the numeral 54 and is shown as having a pair of thermocouple leads 56 and 58 extending therethrough. As in the aforedescribed embodiment of the present invention, the wall 54 might be comprised of an alloy of 80% platinum and 20% rhodium; the lead 56 might be an alloy of 87% platinum and 13% rhodium, and the lead 58 might be pure platinum. The leads 58 and 56 are joined at a welded junction 60 within the bushing and also welded to the interior surface of the lining 54 by welds $56_a$ and $58_a$, respectively.

Unlike the connection of the present invention, the extended portions of the thermocouple leads in the prior art arrangement depicted in FIGS. 2A and 2B extend generally normal from the lining of the bushing. These extended portions are designated $56_a$ and $56_b$. FIG. 2B depicts the condition which occurs when the rhodium from the bushing migrates into the lead $56_b$ as the result of aging of the bushing. As shown in the latter figure, migration has occurred from the location of the junction 60 at temperature $T_1$ to a location spaced away from the lining 50 at temperature $T_2$. Because the lead $56_b$ extends generally normal from the bushing, temperature $T_2$ is appreciably less than that of temperature $T_1$ and, as a result, the thermocouple output does not accurately reflect bushing temperature.

From experience with the prior art arrangement depicted in FIGS. 2A and 2B, it has been found that with a type "R" thermocouple, the temperature reading from the thermocouple fades (i.e., decreases) by approximately 0.75° F. per day. This is the result of decrease of thermocouple output. Thermocouple output varies with the type of thermocouple involved. The following are typical output readings at 2300° F.:

| Thermocouple Type | Lead Content | Millivolt Reading |
|---|---|---|
| "R" | #1 pure platinum | 14 |
|  | #2 87% platinum/13% rhodium |  |
| "S" | #1 pure platinum | 12.67 |
|  | #2 90% platinum/10% rhodium |  |
| "B" | #1 94% platinum/6% rhodium | 7.4 |
|  | #2 70% platinum/30% rhodium |  |

The useful life of bushings of the type here concerned is approximately 9 months. It is estimated that the migration of the interface between the dissimilar metals of the thermocouple would be between one-quarter and one-half inches over this period of time. Accordingly with extended portions $44_b$ and $46_b$ of approximately 5 inches length, the connection of the present invention provides for constant calibration throughout normal life of the bushing.

Conclusion

Although a preferred embodiment of the invention has been illustrated and described, it should be understood that the invention is not intended to be limited to this embodiment. For example, it is anticipated that the invention may be used with type "r", "S", or "B" thermocouples and that the platinum/rhodium alloy of the bushing may vary from the example given (e.g., the bushing could be an alloy of 90% platinum and 10% rhodium). It is also anticipated that the invention may find the application in any metallic bushing and thermocouple combination wherein the thermocouple is connected to the bushing and at least one of the leads of the thermocouple has the property of forming an alloy with the material of the bushing, whereby the interface between the leads of the thermocouple migrates.

What is claimed is:

1. In combination with a platinum/rhodium bushing for the drawing of glass fiber, an improved thermocouple connection for sensing the temperature of the bushing, said connection comprising:

a first lead of platinum and a second lead of a platinum/rhodium alloy;

a thermocouple junction between said leads at and in contact with the bushing; and extended portions of said leads extending directly from the bushing and over a length so closely adjacent the bushing that the temperature of the leads over said length is substantially equal to the temperature of the bushing.

2. In a combination according to claim 1 wherein the bushing is laterally confined within a blcok of refractory material, the improvement wherein the leads are disposed within said refractory material.

3. In a combination according to claim 1 wherein the bushing is an alloy of 80% platinum and 20% rhodium, the improvement wherein the second lead is an alloy of 87% platinum and 13% rhodium.

4. In a combination according to claim 1 wherein the bushing is of elongate configuration with an orifice plate extending over the lower side thereof, the improvement wherein the junction is immediately adjacent the orifice plate and the extended portions of the leads extend lengthwise of the bushing.

5. In a combination according to claim 1, the improvement wherein the junction comprises:

a pair of apertures extending through the bushing;

portions of said respective leads extending through said apertures and into the interior of the bushing; and weld means connecting said leads to one another and to said bushing.

6. In a combination according to claim 5, the improvement wherein the weld means connects the leads together to the interior of the bushing.

7. In combination with a platinum/rhodium bushing for the drawing of glass fiber and a thermocouple connection for said bushing having first lead of platinum and a second lead of a platinum/rhodium alloy joined to one another at a junction on the bushing, a method of maintaining the calibration of said thermocouple connection substantially constant as the bushing ages, said method comprising extending said leads directly from the bushing and over a length so closely adjacent the bushing that the temperature of said leads over said length is substantially equal to the temperature of the bushing.

8. In combination with a platinum/rhodium bushing for the drawing of glass fiber, an improved thermocouple connection for sensing the temperature of the bushing, said connection comprising: first and second leads, one of said leads having a high rhodium content relative to the other; a thermocouple junction between said leads at and in contact with the bushing; and, extended portions of said leads extending directly from the bushing and over a length so closely adjacent to the bushing that the temperature of the leads over said length is substantially equal to the temperature of the bushing.

9. In combination with a metallic bushing for the drawing of glass fiber and a thermocouple connected to the bushing to sense bushing temperature, said thermocouple comprising dissimilar metallic leads connected to the bushing, at least one of which leads as the property of forming an alloy with the material of the bushing whereby the interface between the leads migrates, an improved method of maintaining the calibration of said thermocouple comprising extending said one lead directly from the bushing and over a length so closely adjacent the bushing that the temperature of said lead over said length is substantially equal to the temperature of the bushing.

10. In a combination according to claim 9, the improved method wherein both of said leads extend directly from the bushing over a length so closely adjacent the bushing that the temperature of said leads over said length is substantially equal to the temperature of the bushing.

* * * * *